United States Patent
Goo

(10) Patent No.: US 10,566,887 B2
(45) Date of Patent: Feb. 18, 2020

(54) APPARATUS FOR ROTATING A SHAFT USING AN ELECTROMAGNET

(71) Applicant: Jei Hyun Goo, Seoul (KR)

(72) Inventor: Jei Hyun Goo, Seoul (KR)

(*) Notice: Subject to any disclaimer, the term of this patent is extended or adjusted under 35 U.S.C. 154(b) by 0 days.

(21) Appl. No.: 16/376,339

(22) Filed: Apr. 5, 2019

(65) Prior Publication Data

US 2019/0238036 A1    Aug. 1, 2019

Related U.S. Application Data

(63) Continuation of application No. PCT/KR2018/006339, filed on Jun. 4, 2018.

(30) Foreign Application Priority Data

Jun. 22, 2017 (KR) .......................... 10-2017-0078903

(51) Int. Cl.
*H02K 21/00* (2006.01)
*H02K 21/14* (2006.01)
(Continued)

(52) U.S. Cl.
CPC ............. *H02K 21/14* (2013.01); *G05F 1/613* (2013.01); *H01F 7/06* (2013.01); *H01F 7/122* (2013.01); *H01F 7/14* (2013.01); *H02J 7/007* (2013.01); *H02K 11/22* (2016.01); *H02K 11/33* (2016.01); *H02K 21/12* (2013.01); *H02K 53/00* (2013.01); *H02P 7/04* (2016.02)

(58) Field of Classification Search
CPC ........ H02K 21/14; H02K 11/22; H02K 11/33; H02K 21/12; H02K 53/00; H02P 7/04; G05F 1/613; H01F 7/06; H01F 7/122; H01F 7/14; H02J 7/007

USPC ................. 310/152, 68 R, 68 B, 68 D, 71, 310/156.01–156.84

See application file for complete search history.

(56) References Cited

U.S. PATENT DOCUMENTS 4,687,981 A * 8/1987 Okada ..................... G07F 17/34
                                                            318/685
4,882,524 A * 11/1989 Lee ......................... H02K 29/10
                                                            318/400.4
(Continued)

FOREIGN PATENT DOCUMENTS

| TW | I636642 B | 9/2018 |
|---|---|---|
| WO | 01/052390 A1 | 7/2001 |
| WO | 2015/142084 A1 | 9/2015 |

OTHER PUBLICATIONS

Written Opinion, dated Sep. 26, 2018, for International Application No. PCT/KR2018/006339.

*Primary Examiner* — Thanh Lam
(74) *Attorney, Agent, or Firm* — LRK Patent Law Firm

(57) ABSTRACT

An apparatus for rotating a shaft by using an electromagnet is provided. Permanent magnets are placed around a shaft to rotate with the shaft, and an electromagnet is placed outside the circumference of the permanent magnets, and a device for activating electromagnet is placed. Two secondary cell batteries are used to activate the electromagnet and the electromagnet makes the permanent magnets rotate. The secondary cell batteries are charged using back-emf which occurs in the electromagnet. Coils are placed around the circumference of the permanent magnets and the rotating permanent magnets generate electricity to the coils.

3 Claims, 5 Drawing Sheets

(51) Int. Cl.
*H01F 7/122* (2006.01)
*H02K 53/00* (2006.01)
*H02K 11/33* (2016.01)
*H01F 7/14* (2006.01)
*H02K 21/12* (2006.01)
*H01F 7/06* (2006.01)
*H02K 11/22* (2016.01)
*G05F 1/613* (2006.01)
*H02J 7/00* (2006.01)
*H02P 7/03* (2016.01)

(56) References Cited

U.S. PATENT DOCUMENTS

| | | | | |
|---|---|---|---|---|
| 4,963,808 | A | * | 10/1990 | Torisawa ............... H02K 29/08 318/254.2 |
| 5,932,984 | A | * | 8/1999 | Murakami ............ G02B 27/646 318/268 |
| 6,007,242 | A | * | 12/1999 | Uehashi ............... H05B 6/6447 374/149 |
| 6,777,838 | B2 | | 8/2004 | Miekka et al. |
| 2007/0210730 | A1 | * | 9/2007 | Lee ........................ H02K 47/16 318/141 |
| 2014/0327385 | A1 | * | 11/2014 | Mizuo ...................... H02P 8/38 318/696 |
| 2019/0123666 | A1 | * | 4/2019 | Mizuo ..................... H02P 6/153 |

\* cited by examiner

APPARATUS FOR ROTATING A SHAFT USING AN ELECTROMAGNET

CROSS-REFERENCE TO RELATED APPLICATIONS

This application is a continuation of International Application No. PCT/KR2018/006339, filed Jun. 4, 2018, which claims priority to Korean Patent Application No. 10-2017-0078903, filed Jun. 22, 2017, the disclosures of which are incorporated by reference herein in their entirety.

BACKGROUND OF THE INVENTION

1. Field of the Invention

The present invention relates to an apparatus for rotating a shaft by using an electromagnet. More specifically, permanent magnets are placed around the shaft in which the permanent magnets can rotate with the shaft and the electromagnet is placed outside the circumference of the permanent magnets and a device for activating electromagnet is placed. Two secondary cell batteries are used to activate the electromagnet and the electromagnet makes the permanent magnets rotate. The secondary cell batteries are charged by using back-emf which occurs in the electromagnet. Coils are placed around the circumference of the permanent magnets and so the rotating permanent magnets generate electricity on the coils.

2. Description of Related Art

In an electronic circuit using a relay, a transistor which is used as a switch is connected to a terminal of the relay and the transistor is connected to the negative side of a battery. As the battery is connected to the relay and disconnected, a voltage higher than the battery voltage occurs momentarily to the relay. This voltage damages the transistor. In order to solve this problem, a diode is used in which the anode of the diode is connected to the relay of which a terminal is connected to the negative side of the battery and the cathode of the diode is connected to the relay of which another terminal is connected to the positive side of the battery. By doing this, the electricity that occurs to the relay flows from the anode of the diode to the cathode thereof. In other words, a high voltage occurs momentarily to the relay of which the terminal is disconnected from the negative side of the battery and so electrons at the relay of which the terminal is connected to the positive side of the battery flow from the cathode of the diode to the anode thereof and flow to the relay. The high voltage to the relay is back-emf that occurs to the relay as the battery is connected to the relay and disconnected.

As a battery is connected to an electromagnet, electrons flow from the negative terminal of the battery to the positive terminal of the battery. As the electromagnet is disconnected from the negative terminal of the battery, electrons do not flow anymore from the negative terminal of the battery to the electromagnet and electrons continue to flow to the positive terminal of the battery and electrons in the electromagnet continue to move forward by the magnetic force of the electromagnet. Within the electromagnet, electrons start to disappear from the terminal which is disconnected from the negative terminal of the battery. Therefore, the number of electrons in the side which is connected to the positive terminal of the battery and the number of electrons in the side which is disconnected from the negative terminal of the battery are different and the difference changes. The difference in the number of electrons of two sides becomes bigger and then becomes smaller. The difference in the number of electrons which occurs in the electromagnet is back-emf. The back-emf becomes bigger and reaches its peak as the difference in the number of electrons of two sides is largest (that is, as electrons exist only in a half of the electromagnet). And then it becomes smaller and disappears.

The voltage of an electromagnet becomes higher than the voltage of a secondary cell battery (secondary cell battery-1) instantly by back-emf which occurs to the electromagnet as the secondary cell battery-1 is disconnected from the electromagnet. If both the positive terminal and the negative terminal of the secondary cell battery-1 are disconnected from both terminals of the electromagnet, the electromagnet becomes a power source instantly and the terminal (terminal B) which is disconnected from the negative terminal of the secondary cell battery-1 becomes the positive terminal and the terminal (terminal A) which is disconnected from the positive terminal of the secondary cell battery-1 becomes the negative terminal. If electrons can flow from the positive terminal of another secondary cell battery (secondary cell battery-2) to the terminal B of the electromagnet but cannot flow reversely and electrons can flow from the terminal A of the electromagnet to the negative terminal of the secondary cell battery-2 but cannot flow reversely, then electrons flow from the positive terminal of the secondary cell battery-2 to the negative terminal of the secondary cell battery-2 and the secondary cell battery-2 is charged.

Then, if the positive terminal of the secondary cell battery-1 is connected to the terminal A of the electromagnet, electrons flow from the electromagnet to the positive terminal of the secondary cell battery-1. And electrons flow from the positive terminal of the secondary cell battery-2 to the terminal B of the electromagnet by the back-emf which occurs to the electromagnet.

By doing this, the electromagnet activates and the power consumption of the secondary cell battery-1 is reduced and the secondary cell battery-2 is charged by the back-emf which occurs to the electromagnet.

In WO 2015/142084 A1 (24 Sep. 2015) (KR 10-1733373 B1 (8, May 2017)), the negative terminal of a secondary cell battery is disconnected from an electromagnet. Electrons which flowed to the electromagnet continue to flow to the positive terminal of the secondary cell battery as the electromagnet is disconnected from the negative terminal of the secondary cell battery. By back-emf which occurs to the electromagnet, electrons in a capacitor flow to the electromagnet and also electrons flow from the positive terminal of the secondary cell battery to the capacitor and the electromagnet. The electrons which flowed to the electromagnet continue to flow to the positive terminal of the secondary cell battery.

SUMMARY OF INVENTION

An object of the present invention is to rotate a shaft with permanent magnets using an electromagnet and to reduce power consumption of secondary cell batteries using back-emf which occurs in the electromagnet. Another object of the present invention is to generate electricity on coils using the rotating permanent magnets.

In order to accomplish the above object, there is provided an apparatus for rotating a shaft includes:

permanent magnets (101, 102, 103, 104, 105, 106) which are placed around a shaft and rotate with the shaft, wherein one pole of each of the permanent magnets faces the shaft and another pole of each of the permanent magnets faces outside, and the permanent magnets are placed in alternating polarity;

an electromagnet (201) which is placed outside the circumference of the permanent magnets;

secondary cell batteries (501, 502) which supply direct current (DC) electric current to the electromagnet;

a rotating component P (301) which is provided on the shaft and used to repeatedly pass and block light of a first photointerrupter (11) to repeatedly connect and disconnect a positive terminal of a first one (501) of the secondary cell batteries to and from a terminal A of the electromagnet, and can be used to repeatedly pass and block light of the first photointerrupter (11) to repeatedly connect and disconnect a negative terminal of the first secondary cell battery (501) to and from a terminal B of the electromagnet, and used to repeatedly pass and block light of a third photointerrupter (21) to repeatedly connect and disconnect a positive terminal of a second one (502) of the secondary cell batteries to and from the terminal B of the electromagnet, and can be used to repeatedly pass and block light of the third photointerrupter (21) to repeatedly connect and disconnect a negative terminal of the second secondary cell battery (502) to and from the terminal A of the electromagnet;

a rotating component N (302) which is provided on the shaft and used to repeatedly pass and block light of a second photointerrupter (12) to repeatedly connect and disconnect the negative terminal of the first secondary cell battery (501) to and from the terminal B of the electromagnet, and used to repeatedly pass and block light of a fourth photointerrupter (22) to repeatedly connect and disconnect the negative terminal of the second secondary cell battery (502) to and from the terminal A of the electromagnet; and a device (401) for activating the electromagnet, wherein the positive terminal of the first secondary cell battery and the terminal A of the electromagnet are connected through a first P channel FET switch (13), the terminal B of the electromagnet and the negative terminal of the first secondary cell battery are connected through a first N channel FET switch (14), the positive terminal of the second secondary cell battery and the terminal B of the electromagnet are connected through a second P channel FET switch (23), and the terminal A of the electromagnet and the negative terminal of the second secondary cell battery are connected through a second N channel FET switch (24), wherein a cathode of a first diode (15) is connected to the positive terminal of the first secondary cell battery (501) and an anode of the first diode is connected to the terminal A of the electromagnet, a cathode of a second diode (16) is connected to the terminal B of the electromagnet and an anode of the second diode is connected to the negative terminal of the first secondary cell battery (501), a cathode of a third diode (25) is connected to the positive terminal of the second secondary cell battery (502) and an anode of the third diode is connected to the terminal B of the electromagnet, a cathode of a fourth diode (26) is connected to the terminal A of the electromagnet and an anode of the fourth diode is connected to the negative terminal of the second secondary cell battery (502), wherein the first P channel FET switch is turned on as the light of the first photointerrupter is passed by the rotating component P and the first P channel FET switch is turned off as the light of the first photointerrupter is blocked by the rotating component P, the first N channel FET switch is turned on as the light of the second photointerrupter is passed by the rotating component N and the first N channel FET switch is turned off as the light of the second photointerrupter is blocked by the rotating component N, the first N channel FET switch can be turned on as the light of the first photointerrupter is passed by the rotating component P and the first N channel FET switch can be turned off as the light of the first photointerrupter is blocked by the rotating component P, the second P channel FET switch is turned on as the light of the third photointerrupter is passed by the rotating component P and the second P channel FET switch is turned off as the light of the third photointerrupter is blocked by the rotating component P, the second N channel FET switch is turned on as the light of the fourth photointerrupter is passed by the rotating component N and the second N channel FET switch is turned off as the light of the fourth photointerrupter is blocked by the rotating component N, the second N channel FET switch can be turned on as the light of the third photointerrupter is passed by the rotating component P and the second N channel FET switch can be turned off as the light of the third photointerrupter is blocked by the rotating component P, and wherein the following routines A and B are alternately performed as the rotating components P and N rotate, routine A: ① both the first P channel FET switch and the first N channel FET switch are turned on and the electromagnet (201) is activated by the first secondary cell battery (501), and ② both the first P channel FET switch and the first N channel FET switch are turned off, wherein the first P channel FET switch and the first N channel FET switch are set to turn-on to start the electromagnet activating at a position where the electromagnet repels one facing permanent magnet of the permanent magnets, wherein electrons flow from the positive terminal of the second secondary cell battery (502) to the terminal B of the electromagnet and flow from the terminal A of the electromagnet to the negative terminal of the second secondary cell (502) battery by back-emf which occurs in the electromagnet, and wherein the routine A is repeated while the electromagnet repels one facing permanent magnet of the permanent magnets and attracts a following permanent magnet of the permanent magnets, and routine B: ① both the second P channel FET switch and the second N channel FET switch are turned on and the electromagnet (201) is activated by the second secondary cell battery (502), and ② both the second P channel FET switch and the second N channel FET switch are turned off, wherein both the second P channel FET switch and the second N channel FET switch can be turned on and off at the same time by using only the second photointerrupter and the rotating component P, wherein the second P channel FET switch and the second N channel FET switch are set to turn-on to start the electromagnet activating at a position where the electromagnet repels one facing permanent magnet of the permanent magnets, wherein electrons flow from the positive terminal of the first secondary cell battery (501) to the terminal A of the electromagnet and flow from the terminal B of the electromagnet to the negative terminal of the first secondary cell battery (501) by back-emf which occurs to the electromagnet, and wherein the routine B is repeated while the electromagnet repels one facing permanent magnet of the permanent magnets and attracts a following permanent magnet of the permanent magnets.

DETAILED DESCRIPTION OF THE INVENTION

A desirable embodiment of the present invention is described by way of example with reference to the accompanying drawings.

Figure 1:
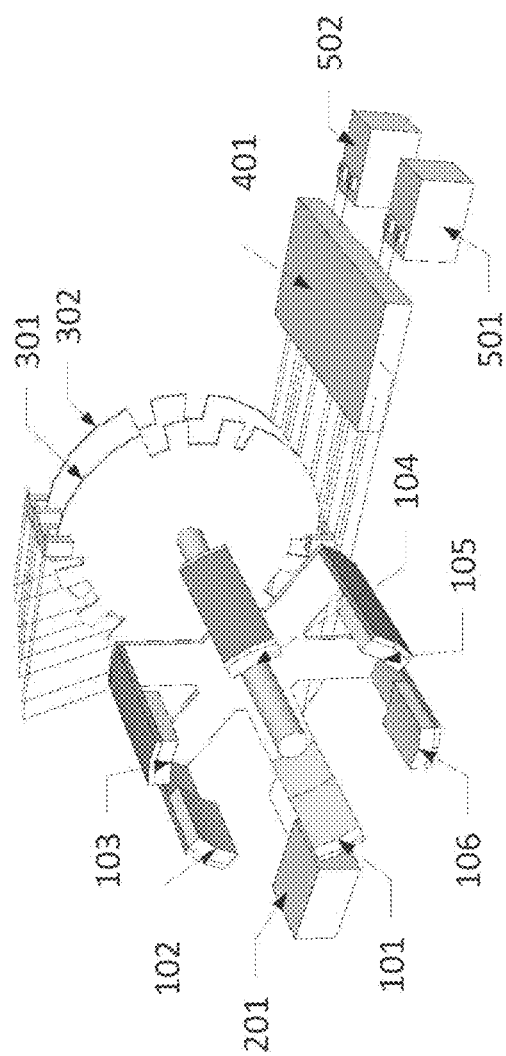
FIG. 1 is a perspective view that illustrates a configuration of an apparatus according to an embodiment of the present invention.
Figure 2:
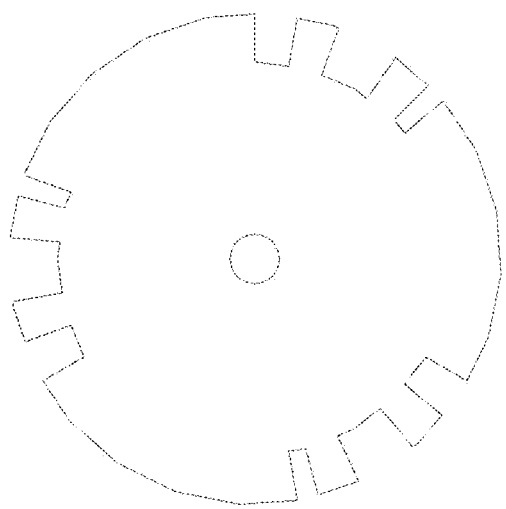
FIG. 2 illustrates a rotating component P to be used for passing and blocking the light of a photointerrupter repeatedly in order to connect the positive terminal of a secondary cell battery to a terminal of an electromagnet and to disconnect them repeatedly in a device for activating electromagnet.
Figure 3:
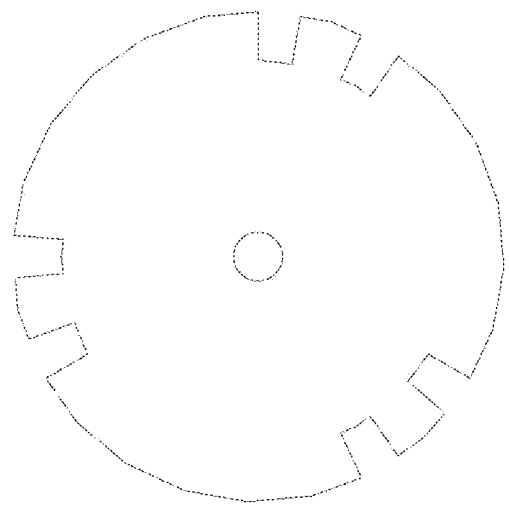
FIG. 3 illustrates a rotating component N to be used for passing and blocking the light of another photointerrupter repeatedly in order to connect the negative terminal of a secondary cell battery to another terminal of the electromagnet and to disconnect them repeatedly in a device for activating electromagnet.
Figure 4:
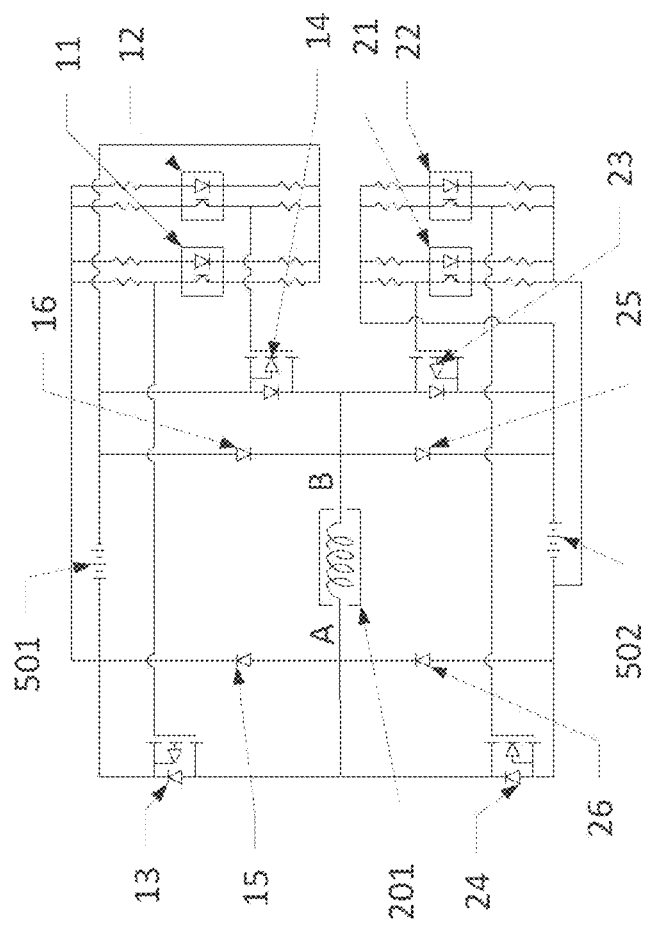
FIG. 4 is an electronic circuit of a device for activating electromagnet.

FIG. 1 is a perspective view that illustrates a configuration of an apparatus according to an embodiment of the present invention. FIG. 2 illustrates a rotating component P to be used for passing and blocking the light of a photointerrupter repeatedly in order to connect the positive terminal of a secondary cell battery to a terminal of an electromagnet and to disconnect them repeatedly in a device for activating electromagnet. FIG. 3 illustrates a rotating component N to be used for passing and blocking the light of another photointerrupter repeatedly in order to connect the negative terminal of a secondary cell battery to another terminal of the electromagnet and to disconnect them repeatedly in a device for activating electromagnet. FIG. 4 is an electronic circuit of a device for activating electromagnet.

As shown in FIG. 1, six permanent magnets (101, 102, 103, 104, 105, 106) are placed to be able to rotate with a shaft and the shaft is placed to be able to rotate with bearings (not shown). An electromagnet (201) is placed outside the circumference of six permanent magnets (101, 102, 103, 104, 105, 106) and the electromagnet is fixed with a fixing means (not shown). A rotating component P (301) and a rotating component N (302) are placed on the shaft and a device (401) for activating electromagnet that implements photointerrupters and other electronic components is used to activate the electromagnet. Two secondary cell batteries (501, 502) are used to supply DC electric current to the electromagnet.

The permanent magnet-1,2,3,4,5,6 (101, 102, 103, 104, 105, 106) are placed with 60° of angular separation in which S poles of permanent magnet-1,3,5 (101, 103, 105) face the shaft and N poles thereof face outside and N poles of permanent magnet-2,4,6 (102, 104, 106) face the shaft and S poles thereof face outside.

The rotating component P (301) is placed on the shaft and the rotating component P (301) passes the light for 10° of angular separation and block the light for 10° of angular separation and pass the light for 5° of angular separation and this process is repeated 2 times and then block the light for 70° of angular separation. This process of 120° of angular separation is continuously repeated while the rotating component P rotates. If electricity flows to an electromagnet and is disconnected as a permanent magnet reaches the electromagnet, the magnetic force of the electromagnet attracts the permanent magnet and so prohibits rotating the permanent magnet. Thus, the process of passing light is not performed anymore as the permanent magnet approaches the electromagnet.

The rotating component N (302) is placed on the shaft and the rotating component N (302) passes the light for 10° of angular separation and block the light for 15° of angular separation and this process is repeated 2 times and then block the light for 70° of angular separation. This process of 120° of angular separation is continuously repeated while the rotating component N rotates.

The rotating component P (301) is used to connect the positive terminal of secondary cell battery-1 (501) to a terminal (terminal A) of the electromagnet (201) and disconnect them. The rotating component N (302) is used to connect the negative terminal of secondary cell battery-1 (501) to another terminal (terminal B) of the electromagnet (201) and disconnect them.

The rotating component P (301) is used to connect the positive terminal of secondary cell battery-2 (502) to terminal B of the electromagnet (201) and disconnect them. The rotating component N (302) is used to connect the negative terminal of secondary cell battery-2 (502) to terminal A of the electromagnet (201) and disconnect them.

The rotating component P (301) and the rotating component N (302) are set to pass the light of photointerrupter-1 (11) & photointerrupter-2 (12) and then block the light of photointerrupter-1 (11) & photointerrupter-2 (12) and then pass the light of photointerrupter-1 (11) as the electromagnet (201) faces permanent magnet-1,3,5 (101,103,105) at the position where the electromagnet (201) repels permanent magnet-1,3,5 (101,103,105) effectively.

The rotating component P (301) and the rotating component N (302) are set to pass the light of photointerrupter-3 (21) & photointerrupter-4 (22) and then block the light of photointerrupter-3 (21) & photointerrupter-4 (22) and then pass the light of photointerrupter-3 (21) as the electromagnet (201) faces permanent magnet-2,4,6 (102,104,106) at the position where the electromagnet (201) repels permanent magnet-2,4,6 (102,104,106) effectively.

The device (401) for activating electromagnet makes the electromagnet (201) activate by changing the polarity of the electromagnet (201) alternately. As shown in FIG. 4, if the light of photointerrupter-1 (11) & photointerrupter-2 (12) is passed through, P channel FET-1 (13) and N channel FET-1 (14) become ON and electrons flow from the negative terminal of secondary cell battery-1 (501) to the positive terminal of secondary cell battery-1 (501) and the electromagnet (201) activates. Then, if the light of photointerrupter-1 (11) & photointerrupter-2 (12) is blocked, then P channel FET-1 (13) and N channel FET-1 (14) become OFF and electrons do not flow from the negative terminal of secondary cell battery-1 (501) to the positive terminal of secondary cell battery-1 (501). At this time, back-emf occurs to the electromagnet (201) and electrons flow from the positive terminal of secondary cell battery-2 (502) to the negative terminal of secondary cell battery-2 (502). Then, if the light of photointerrupter-1 (11) is passed, then P channel FET-1 (13) becomes ON and electrons which are held in the electromagnet (201) flow to the positive terminal of secondary cell battery-1 (501). And by back-emf which occurs to the electromagnet (201) electrons flow from the positive terminal of secondary cell battery-2 (502) to the negative terminal of secondary cell battery-2 (502). The above routine is repeated 2 times while the electromagnet (201) repels one facing permanent magnet and attracts a following permanent magnet. If the light of photointerrupter-3 (21) & photointerrupter-4 (22) is passed through, P channel FET-2 (23) and N channel FET-2 (24) become ON and electrons flow from the negative terminal of secondary cell battery-2 (502) to the positive terminal of secondary cell battery-2 (502) and the electromagnet (201) activates. Then, if the light of photointerrupter-3 (21) & photointerrupter-4 (22) is blocked, then P channel FET-2 (23) and N channel FET-2 (24) become OFF and electrons do not flow from the negative terminal of secondary cell battery-2 (502) to the positive terminal of secondary cell battery-2 (502). At this time, back-emf occurs to the electromagnet (201) and electrons flow from the positive terminal of secondary cell battery-1 (501) to the negative terminal of secondary cell battery-1 (501). Then, if the light of photointerrupter-3 (21) is passed, then P channel FET-2 (23) becomes ON and electrons which are held in the electromagnet (201) flow to the positive terminal of secondary cell battery-2 (502). And by back-emf which occurs to the electromagnet (201) electrons flow from the positive terminal of secondary cell battery-1 (501) to the negative terminal of secondary cell battery-1 (501). The above routine is repeated 2 times while the electromagnet (201) repels one facing permanent magnet and attracts a following permanent magnet.

As permanent magnet-1 (101) reaches the position where the electromagnet (201) repels permanent magnet-1 (101) effectively as shown in FIG. 1, secondary cell battery-1 (501) is discharged and the electromagnet (201) activates. By back-emf which occurs to the electromagnet (201) the electromagnet (201) activates and secondary cell battery-2 (502) is charged. While the electromagnet (201) is activating, the electromagnet (201) repels permanent magnet-1 (101) and attracts permanent magnet-2 (102) and so the shaft rotates and permanent magnet-2 (102) reaches the electromagnet (201).

As permanent magnet-2 (102) reaches the position where the electromagnet (201) repels permanent magnet-2 (102) effectively, secondary cell battery-2 (502) is discharged and the electromagnet (201) activates. By back-emf which occurs to the electromagnet (201) the electromagnet (201) activates and secondary cell battery-1 (501) is charged. While the electromagnet (201) is activating, the electromagnet (201) repels permanent magnet-2 (102) and attracts permanent magnet-3 (103) and so the shaft rotates and permanent magnet-3 (103) reaches the electromagnet (201).

Namely, by using two batteries (501, 502) and changing the polarity of the electromagnet (201) alternately, the electromagnet (201) repels one facing permanent magnet and attracts a following permanent magnet and so permanent magnets (101, 102, 103, 104, 105, 106) rotate continuously.

Figure 5:
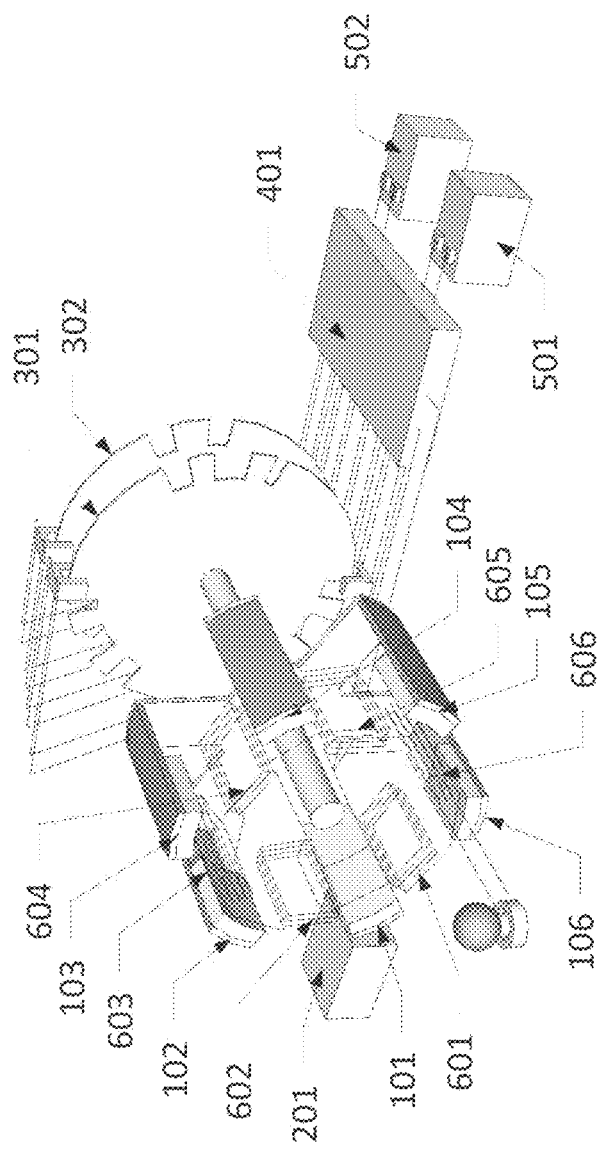
FIG. 5 is a perspective view that illustrates a configuration of an apparatus according to another embodiment of the present invention and coils are placed inside the circumference of permanent magnets in the apparatus of FIG. 1.

FIG. 5 is a perspective view that illustrates a configuration of an apparatus according to another embodiment of the present invention and coils are placed inside the circumference of the permanent magnets in the apparatus of FIG. 1. Six coils (601, 602, 603, 604, 605, 606) are placed inside the circumference of six permanent magnets (101, 102, 103, 104, 105, 106) and the coils are fixed with fixing means (not shown). The coils are connected in a way of single-phase power generation. The rotating permanent magnets generate alternate current to coil-1,2,3,4,5,6 (601, 602, 603, 604, 605, 606).

According to the present invention, an electromagnet is used to rotate a shaft with permanent magnets and the power consumption of secondary cell batteries can be reduced by using back-emf which occurs to the electromagnet. Also, the rotating permanent magnets can generate electricity to coils. The present invention can be used in various areas such as electric cars, electric airplanes, electric boats, electric bicycles, drones, etc.

The present invention is not limited to the embodiments of the present invention that are described herein and it should be clear to those who have general knowledge in the technical area related to the present invention that various changes can be made without departing from the scope of the technical thoughts of the present invention.

What is claimed is:
1. An apparatus for rotating a shaft, comprising:
permanent magnets which are placed around a shaft and rotate with the shaft, wherein one pole of each of the permanent magnets faces the shaft and another pole of each of the permanent magnets faces outside, and the permanent magnets are placed in alternating polarity;
an electromagnet which is placed outside the circumference of the permanent magnets;
secondary cell batteries which supply direct current (DC) electric current to the electromagnet;
a rotating component P which is provided on the shaft and used to repeatedly pass and block light of a first photointerrupter to repeatedly connect and disconnect a positive terminal of a first one of the secondary cell batteries to and from a terminal A of the electromagnet, and can be used to repeatedly pass and block light of the first photointerrupter to repeatedly connect and disconnect a negative terminal of the first secondary cell battery to and from a terminal B of the electromagnet, and used to repeatedly pass and block light of a third photointerrupter to repeatedly connect and disconnect a positive terminal of a second one of the secondary cell batteries to and from the terminal B of the electromagnet, and can be used to repeatedly pass and block light of the third photointerrupter to repeatedly connect and disconnect a negative terminal of the second secondary cell battery to and from the terminal A of the electromagnet;
a rotating component N which is provided on the shaft and used to repeatedly pass and block light of a second photointerrupter to repeatedly connect and disconnect the negative terminal of the first secondary cell battery to and from the terminal B of the electromagnet, and used to repeatedly pass and block light of a fourth photointerrupter to repeatedly connect and disconnect the negative terminal of the second secondary cell battery to and from the terminal A of the electromagnet; and
a device for activating the electromagnet,
wherein the positive terminal of the first secondary cell battery and the terminal A of the electromagnet are connected through a first P channel FET switch, the terminal B of the electromagnet and the negative terminal of the first secondary cell battery are connected through a first N channel FET switch, the positive terminal of the second secondary cell battery and the terminal B of the electromagnet are connected through a second P channel FET switch, and the terminal A of the electromagnet and the negative terminal of the second secondary cell battery are connected through a second N channel FET switch, wherein a cathode of a first diode is connected to the positive terminal of the first secondary cell battery and an anode of the first diode is connected to the terminal A of the electromagnet, a cathode of a second diode is connected to the terminal B of the electromagnet and an anode of the second diode is connected to the negative terminal of the first secondary cell battery, a cathode of a third diode is connected to the positive terminal of the second secondary cell battery and an anode of the third diode is connected to the terminal B of the electromagnet, a cathode of a fourth diode is connected to the terminal A of the electromagnet and an anode of the fourth diode is connected to the negative terminal of the second secondary cell battery, wherein the first P channel FET switch is turned on as the light of the first photointerrupter is passed by the rotating component P and the first P channel FET switch is turned off as the light of the first photointerrupter is blocked by the rotating component P, the first N channel FET switch is turned on as the light of the second photointerrupter is passed by the rotating component N and the first N channel FET switch is turned off as the light of the second photointerrupter is blocked by the rotating component N, the first N channel FET switch can be turned on as the light of the first photointerrupter is passed by the rotating component P and the first N channel FET switch can be turned off as the light of the first photointerrupter is blocked by the rotating component P, the second P channel FET switch is turned on as the light of the third photointerrupter is passed by the rotating component P and the second P channel FET switch is turned off as the light of the third photointerrupter is blocked by the rotating component P, the second N channel FET switch is turned on as the light of the fourth photointerrupter is passed by the rotating component N and the second N channel FET switch is turned off as the light of the fourth photointerrupter is blocked by the rotating component N, the second N channel FET switch can be turned on as the light of the third photointerrupter is passed by the rotating component P and the second N channel FET switch can be turned off as the light of the third photointerrupter is blocked by the rotating component P, and wherein the following routines A and B are alternately performed as the rotating components P and N rotate, routine A: ① both the first P channel FET switch and the first N channel FET switch are turned on and the electromagnet is activated by the first secondary cell battery, and ② both the first P channel FET switch and the first N channel FET switch are turned off, wherein the first P channel FET switch and the first N channel FET switch are set to turn-on to start the electromagnet activating at a position where the electromagnet repels one facing permanent magnet of the permanent magnets, wherein electrons flow from the positive terminal of the second secondary cell battery to the terminal B of the electromagnet and flow from the terminal A of the electromagnet to the negative terminal of the second secondary cell battery by back-emf which occurs in the electromagnet, and wherein the routine A is repeated while the electromagnet repels one facing permanent magnet of the permanent magnets and attracts a following permanent magnet of the permanent magnets, and routine B: ① both the second P channel FET switch and the second N channel FET switch are turned on and the electromagnet is activated by the second secondary cell battery, and ② both the second P channel FET switch and the second N channel FET switch are turned off, wherein the second P channel FET switch and the second N channel FET switch are set to turn-on to start the electromagnet activating at a position where the electromagnet repels one facing permanent magnet of the permanent magnets, wherein electrons flow from the positive terminal of the first secondary cell battery to the terminal A of the electromagnet and flow from the terminal B of the electromagnet to the negative terminal of the first secondary cell battery by back-emf which occurs to the electromagnet, and wherein the routine B is repeated while the electromagnet repels one facing permanent magnet of the permanent magnets and attracts a following permanent magnet of the permanent magnets.

2. The apparatus of claim 1, further comprising coils which are placed inside the circumference of the permanent magnets, wherein electricity is generated on the coils by rotation of the permanent magnets.

3. The apparatus of claim 1, wherein:
after performing ① and ② in the routine A, the routine A further includes that ③ the first P channel FET switch is turned on, and
after performing ① and ② in the routine B, the routine B further includes that ③ the second P channel FET switch is turned on.

* * * * *